United States Patent
Milanovska et al.

(10) Patent No.: US 10,036,556 B2
(45) Date of Patent: *Jul. 31, 2018

(54) COATED GLASS OR GLASS CERAMIC SUBSTRATE WITH HAPTIC PROPERTIES

(71) Applicant: Schott AG, Mainz (DE)

(72) Inventors: Angelina Milanovska, Mainz (DE); Eva Engel, Ockenheim (DE)

(73) Assignee: SCHOTT AG, Mainz (DE)

( * ) Notice: Subject to any disclaimer, the term of this patent is extended or adjusted under 35 U.S.C. 154(b) by 625 days.

This patent is subject to a terminal disclaimer.

(21) Appl. No.: 14/133,941

(22) Filed: Dec. 19, 2013

(65) Prior Publication Data

US 2014/0178642 A1 Jun. 26, 2014

(30) Foreign Application Priority Data

Dec. 20, 2012 (DE) .................. 20 2012 012 372

(51) Int. Cl.
- *F24C 15/10* (2006.01)
- *C03C 17/00* (2006.01)
- *C03C 17/34* (2006.01)

(52) U.S. Cl.
CPC ............ *F24C 15/10* (2013.01); *C03C 17/007* (2013.01); *C03C 17/34* (2013.01); *C03C 2217/452* (2013.01); *C03C 2217/47* (2013.01); *C03C 2217/478* (2013.01); *C03C 2217/76* (2013.01); *C03C 2217/77* (2013.01); *Y10T 428/24372* (2015.01); *Y10T 428/24413* (2015.01); *Y10T 428/24421* (2015.01)

(58) Field of Classification Search
CPC ....... F24C 15/10; C03C 17/34; C03C 17/007; C03C 2217/77; C03C 2217/76; C03C 2217/452; C03C 2217/47; Y10T 428/24372; Y10T 428/24421
See application file for complete search history.

(56) References Cited

U.S. PATENT DOCUMENTS

| 3,354,022 A | 11/1967 | Dettre et al. |
| 6,258,418 B1 | 7/2001 | Rudder et al. |

(Continued)

FOREIGN PATENT DOCUMENTS

| CA | 2512259 | 1/2007 |
| DE | 10063739 | 6/2002 |

(Continued)

OTHER PUBLICATIONS

Zhang Yang et al., "The professional serial teaching material decorations material of higher education building decoration fitment", p. 326, China building materials publishing house, Apr. 30, 2006, with English translation, 5 pages.

*Primary Examiner* — Laura A Auer
(74) *Attorney, Agent, or Firm* — Ohlandt, Greeley, Ruggiero & Perle, L.L.P.

(57) ABSTRACT

A coated glass or glass ceramic substrate with a local-area and/or full-area layer having haptic properties is provided. The layer has a haptically perceptible texture and includes texturing inorganic and/or polysiloxane-based particles that are fixed on the substrate by a layer-forming material. The particles cause protrusions on the layer and so produce the haptically perceptible texture. The substrate is also provided, at least partially, with at least one additional layer.

30 Claims, 7 Drawing Sheets

(56) References Cited

U.S. PATENT DOCUMENTS

| | | |
|---|---|---|
| 6,514,605 B2 | 2/2003 | Rudder et al. |
| 2001/0031360 A1 | 10/2001 | Rudder et al. |
| 2002/0142150 A1 | 10/2002 | Baumann et al. |
| 2003/0138661 A1 | 7/2003 | Souchard et al. |
| 2003/0152780 A1* | 8/2003 | Baumann ............... B08B 17/06 428/429 |
| 2003/0218001 A1 | 11/2003 | Siebers et al. |
| 2004/0086689 A1 | 5/2004 | Takahashi et al. |
| 2004/0115352 A1 | 6/2004 | Schultheis et al. |
| 2004/0148869 A1 | 8/2004 | Celikkaya et al. |
| 2004/0241443 A1 | 12/2004 | Decker et al. |
| 2005/0172829 A1* | 8/2005 | Shimatani ............... C03C 17/06 99/403 |
| 2006/0024493 A1 | 2/2006 | Jones et al. |
| 2006/0189470 A1 | 8/2006 | Mitra |
| 2007/0231542 A1* | 10/2007 | Deng ..................... B08B 17/06 428/141 |
| 2008/0015102 A1 | 1/2008 | Rosenflanz et al. |
| 2008/0190409 A1 | 8/2008 | Demol et al. |
| 2009/0149573 A1 | 6/2009 | Venzmer et al. |
| 2010/0081750 A1* | 4/2010 | Guire .................... C08K 5/0025 524/493 |
| 2010/0089905 A1 | 4/2010 | Nelson et al. |
| 2012/0189843 A1* | 7/2012 | Chang ..................... C03C 17/30 428/337 |
| 2013/0273320 A1* | 10/2013 | Bockmeyer ........... C03C 17/007 428/147 |
| 2014/0113144 A1* | 4/2014 | Loth ..................... C09D 5/1662 428/421 |

FOREIGN PATENT DOCUMENTS

| | | |
|---|---|---|
| DE | 102007019853 A1 | 10/2008 |
| DE | 202009000139 U1 | 5/2010 |
| EP | 1404625 | 12/2004 |
| EP | 1876394 A2 | 1/2008 |
| EP | 1352986 | 11/2008 |
| EP | 1197268 | 3/2011 |
| EP | 2592056 A1 | 5/2013 |
| JP | 2001328846 | 11/2001 |
| JP | 2004172607 A | 6/2004 |
| JP | 2005049050 | 2/2005 |
| JP | 2008507438 | 3/2008 |
| WO | 0056537 | 9/2000 |
| WO | 01074739 | 10/2001 |
| WO | 2011085997 A1 | 7/2011 |

\* cited by examiner

Top: Transmission = Transmittance
y-axis: Transmittance [%]
x-axis: Wavelength [nm]

COATED GLASS OR GLASS CERAMIC SUBSTRATE WITH HAPTIC PROPERTIES

CROSS REFERENCE TO RELATED APPLICATIONS

This application claims benefit under 35 U.S.C. § 119(a) of German Patent Application No. 20 2012 012 372.6, filed Dec. 20, 2012, the entire contents of which are incorporated herein by reference.

BACKGROUND OF THE INVENTION

1. Field of the Invention

The disclosure generally relates to glass or glass ceramic articles. In particular the disclosure relates to such an article provided with a haptically perceptible surface. The disclosure also relates to a glass frit for producing heat-resistant layers which can be applied to substrate surfaces, wherein these layers may have specific haptic properties. Moreover, the disclosure relates to a method for producing such layers. The substrates may comprise various materials, in particular from glass or glass ceramics, and may be used for example in the fields of household appliances or display areas.

2. Description of Related Art

Glass or glass ceramic substrates are used in a variety of household appliances or for displays, for example for glass ceramic cooktops in built-in cookers, and also for viewing windows in doors of cooking appliances, baking ovens, or microwave devices. Increasingly, these substrates or surfaces thereof have different partial surface areas or zones accomplishing different functions.

For example, while glass ceramic cooktops originally only included one or more areas adapted as a cooking hob, current cooktops in addition to these cooking hob areas may include partial areas designated for operating the devices. Previously, the various partial areas or sections were mainly visually perceptible. Meanwhile, haptic perception of the different functions is of increasing importance.

Haptic perception in particular includes an active sensing of specific areas, sizes, textures, and contours at the surface of an object by touching or palpation. In the decorative sector, haptic properties, for example of surfaces, are known. DE 20 2009 000 139 U1 describes a switch surface area which has position marks with haptic properties. A relief palpable by a user represents the position marks. This switch surface area is produced by machining such as milling.

Mechanical methods such as polishing or sandblasting are also known. The use of mechanical methods to produce a structure with haptic properties on a substrate surface is often very expensive. Moreover, damage of the surface is likely to occur, which may adversely affect the strength.

EP 1 876 394 A2 describes a glass ceramic cooktop with a sliding strip which has a texture, at least partly, which has a haptic effect. The texture is applied by printing.

DE 10 2007 019 853 A1 describes a method for producing three-dimensional or haptically perceptible information on a planar information carrier. The information is applied to the information carrier by printing.

Applying layers with haptic properties by printing may be significantly more cost-effective, however, a drawback thereof is that these layers often exhibit only low temperature resistance and low mechanical stability. For example, for locally textured layers on a glass ceramic cooktop, which are applied from polyurethane by printing, there is a considerable risk of damage under mechanical stress, due to insufficient bonding to the substrate. Advantageous would be to have a better bonding of the layer to the substrate, for example by fusing in case of glass and glass ceramic substrates.

Furthermore, methods are known for patterning glass surfaces using etching processes, wherein patterning is often accomplished by means of hydrofluoric acid. Such methods are considered to be complex and dangerous, and the variety of texture shapes is limited by the etching process.

WO 2011/085997 describes another method, wherein first a sol-gel layer is applied to a panel, and then a haptically perceptible texture is produced in this layer by means of an embossing tool. Subsequently, the sol-gel layer is cured. This method is also complex, since in addition to the application of the layer it requires a separate work process for embossing.

EP 2 592 056 A1 describes a coated glass or glass ceramic substrate with a local-area and/or a full-area layer having haptic properties such that the layer has a haptically perceptible texture, the layer comprising texturing inorganic and/or polysiloxane-based particles that are fixed on the substrate by a layer-forming material, the particles causing protrusions on the layer and thus producing the haptically perceptible texture.

Given the aforementioned, it is an object of the present disclosure to enable simple and variable production of haptically perceptible and further, particularly optically perceptible properties of a glass or glass ceramic surface.

SUMMARY

Accordingly, the disclosure provides a coated glass or glass ceramic substrate comprising a local and/or complete-surface layer with haptic properties so that the layer has a haptically perceptible texture, the layer comprising texturing inorganic and/or polysiloxane-based particles which are fixed on the substrate by a layer-forming material, wherein the particles cause protrusions on the layer and so produce the haptically perceptible texture, and wherein the substrate is provided, at least partially, with at least one additional layer W.

The texturing particles can partially protrude from the layer-forming material and/or may not be covered, at least partially, by layer-forming material. Preferably, the layer and the additional layer W are disposed fully or partially over one another.

The additional layer W can be disposed on or under the layer.

Preferably, the coated substrate has at least one of the following properties due to the additional layer W: visible to the human eye, can be easily cleaned, hydrophobic, antibacterial, reduced visibility of fingerprints, dirt-repelling.

The layer and/or the layer W can be printed on, particularly by means of screen printing.

When compared to etched surfaces, the disclosure provides several advantages. First, the surface is significantly less sensitive to fingerprints. Also, it is easier produced. For example, HF etching and masking for local patterning is not necessary. The production of the layer allows for good process control. Typically, the RMS and Ra values are significantly lower than those of etched glass. Finally, glass ceramic substrates are very difficult to be etched.

The disclosure is suitable, inter alia, for: matted areas in transparent cooktops, for displays, or other light applications; as a substitute of matted or etched glass surfaces in the kitchen and household appliance sector; for front panels of ovens, refrigerators, etc.; as a liquid stopping coating on cooktops; as a coating for base plates for ceramization of glass ceramics; as a substitute of matted or etched glass surfaces in architecture, for example for doors, shower cubicles, facade elements; as a substitute of matted or etched glass surfaces in the automotive and aviation sector.

The layer-forming material may comprise an organic and/or inorganic and/or polysiloxane-based and/or silazane-based and/or glass-based layer-forming matrix. In case of an organic layer-forming material it preferably comprises a polymer, including polyurethane, polyacrylate, polymethacrylate, polyvinyl alcohol, polyvinyl chloride, polyvinyl acetals, polyvinyl pyrrolidone, polystyrene, epoxy, polyolefins, and mixtures of these constituents, preferably polyethylene, polypropylene, polycarbonate, polyethylene terephthalate, perfluorinated polymers, and mixtures thereof.

In case polysiloxane resin is used as the layer-forming material, methylpolysiloxane and/or phenylpolysiloxane, methylphenylpolysiloxane and/or vinyl-functionalized polysiloxane resin and/or ally-functionalized polysiloxane resin and/or methacrylic functionalized polysiloxane resin and/or epoxy-functionalized polysiloxane resin and/or hydroxyl-functionalized polysiloxane resin and/or carboxyl-functionalized polysiloxane resin is preferred.

Another embodiment of the disclosure is based on producing the layer in a sol-gel process. For this purpose, the layer-forming material comprises a sol-gel material, including inorganic and/or hybrid polymeric sol-gel materials.

In particular for use on cooktops or oven doors, and at other glass or glass ceramic articles which are subjected to elevated temperatures during operation, it is advantageous if the layer-forming material has a temperature resistance of more than 150° C., preferably more than 250° C., most preferably more than 500° C.

To achieve considerable haptic effects it is advantageous when the recognizable degree of surface occupancy of texturing particles that protrude from the layer-forming material is greater than 5%, preferably greater than 20%, most preferably greater than 30%.

Furthermore, it is advantageous when the volume ratio of layer-forming material to texturing particles is greater than 0.1, preferably greater than 0.2, most preferably greater than 0.4. This provides for good embedding of the particles and hence for a good durability of the haptic effect.

In particular it is favorable to choose the mass ratio of layer-forming material to texturing particles in a range from 20 to 0.1, preferably from 3 to 0.25, and more preferably from 1.8 to 0.4. If the proportion of layer-forming material becomes greater than the above-specified ranges, the haptic effect is lower or even disappears.

In order to achieve a uniform haptically perceptible property, it is furthermore preferable to choose the amount of particles such that the average spacing of texturing particles, based on the spacing from particle center to particle center, is smaller than 4 times, preferably smaller than 2 times the mean particle diameter of the texturing particles.

Surprisingly, very small layer thicknesses are sufficient to achieve the haptic effect. So, in one embodiment of the disclosure, the average layer thickness ranges from 0.5 µm to 50 µm, preferably from 1 µm to 25 µm, most preferably from 2 µm to 10 µm (micrometers).

As to the average thickness of the matrix layer, or of the layer-forming material at locations without texturing particles, a thickness from 0.1 µm to 20 µm, preferably from 1 µm to 5 mm, most preferably from 1.5 µm to 3 µm is already sufficient.

Furthermore, it is favorable to select the particle size and/or layer thickness such that the average layer thickness of the layer-forming material is always smaller than the mean diameter of the texturing particles, preferably smaller than 80% of the mean particle diameter. This ensures that the particles protrude from the layer and are not fully embedded in the layer which would form a planar surface in the area of the particle.

Moreover, good haptic effects are achieved when the peak-to-valley (PV) value for a layer that includes edgeless spherical particles ranges from 4 to 10 µm, more preferably from 6 to 10 µm, most preferably from 7.5 to 9.5 µm. The PV value denotes the average height difference between the lowest point between two particles and the highest point on one of these particles.

Particularly suitable as spherical or generally rounded particles are silicone-based spherical particles.

In case of particles having polygonal outer contours which cause a rather rough appearance, the PV value preferably ranges from 10 to 20 µm, more preferably from 11 to 18 µm, most preferably from 12.5 to 15 µm. This somewhat higher value is desirable to obtain a rather rough appearance, in contrast to rounded particles which cause a rather velvety appearance.

For the texturing particles, glass or polysiloxane materials are suitable, in particular $SiO_2$, phenylpolysiloxane, methylpolysiloxane, methylphenylpolysiloxane, organically functionalized polysiloxanes, low-alkali borosilicate and/or alkali aluminosilicate glasses.

In addition to the layer-forming material and the particles causing the haptic appearance, advantageously, inorganic and/or organic fillers and/or pigments may also be included. Particularly preferred as pigments, dyes, fillers, and additives are $TiO_2$, spinels in general, preferably CrCu spinels, Fe spinels, mica, and mica-based effect pigments.

In order to obtain flexible and sufficiently firm layers which provide firm embedding of the particles, preferably the mass fraction of these additional pigments, fillers or additives in the total mass of the layer-forming material binding the texturing particles ranges from 0 to 60 wt. %, preferably from 3 to 40 wt. %, and more preferably from 5 to 30 wt. %.

The layers according to the disclosure may be effective to not only obtain haptic but also visual effects. Preferably, the coated substrate exhibits at least one of the following reflection and transmission characteristics: The reflectance at 550 nm (nanometer) ranges from 6 to 9%, preferably from 7 to 8%. The transmittance at 550 nm ranges from 75 to 85%, preferably from 80 to 85%, more preferably from 81 to 83%. The layer may be applied on transparent glass ceramic, or on green glass. In the latter case, the green glass with the layer already applied is ceramized to produce the glass ceramic.

It is also possible to apply the layer on a soda-lime substrate glass and to burn-in the layer during a tempering process.

The disclosure is intended to enable to provide the surface or a portion of the surface of a substrate with a temperature-stable layer, and the produced layer should have haptic properties.

The produced layer is intended to have selective haptic properties. For example, a produced layer should have a characteristic which causes that the layer, when contacted with the skin, feels soft and easily sliding, or a characteristic that causes the layer to be percepted as slightly braking.

Also, it is intended to provide sections or sub-areas of the surface with different haptic properties.

The produced layer should exhibit high chemical resistance, for example a high resistance to acids, and good cleanability.

Furthermore, the produced layer should be thermally and mechanically stable.

The produced layer is intended to be suitable for use at surfaces of household appliances, and for devices from the display sector.

Also, the layer should be suitable to be applied to the substrate using simple processes.

The disclosure further relates to a glass frit for producing a temperature-stable layer with haptic properties by glazing on a substrate or a substrate section, with the glass frit comprising glass flow forming particles and texturing particles.

Glazing, enameling, and decorating is known for obtaining specific surfaces of a substrate. For this purpose, the raw materials required for the preparation of the glaze may be melted into a glass which, once melted and cooled-down, can then be ground. The grounded product is also referred to as glass frit. A glass frit produced in this way may be mixed with auxiliary materials such as suspending agents, in order to obtain a paste-like material, referred to as a paste below. This paste may be applied to the substrate surface using various processes, for example screen printing, by a sol-gel process, or by a spraying or brushing process. A layer applied in this manner may be burned-in at elevated temperatures which are typically below the softening range of the substrate.

The disclosure includes a glass for the glass flow forming particles, which allows to add temperature-stable texturing particles to the glass frit and to produce a paste from this glass frit, which may be applied on a substrate in form of a layer and may cause different haptic properties thereon. Preferably, the glass is free of lead and cadmium.

The glass exhibits a high bending stiffness, in particular also when coating glass or glass ceramic substrates having a thermal expansion coefficient of less than $4 \times 10^{-6}$/K, preferably less than $2 \times 10^{-6}$/K, in a temperature range from 20° C. to 700° C.

Once melted and cooled down, the glass may be ground into the glass flow forming particles. Preferably, the mean particle diameter is ≤10 μm, preferably ≤6 μm, and most preferably ≤4 μm.

Then, the glass flow forming particles may be mixed with texturing particles. Preferably, the mass ratio of glass flow forming particles to texturing particles ranges from 20 to 0.1, preferably from 3 to 0.25, and more preferably from 1.8 to 0.4.

The texturing particles may cause a specific haptic property of the so produced layer. In the context of the present disclosure, a haptic property of a layer or a surface is to be understood as a characteristic which enables to actively sense specific features of an object or a substrate surface, such as size, shape, texture or weight, through haptic perception by integrating all skin senses and the depth sensitivity.

The haptic property of the produced layer may be adjusted by the outer contour, the material, and/or the particle concentration. For example a layer with a velvety haptic property may be produced, or a layer having a braking haptic property.

In this way, for example, a portion of a glass ceramic substrate surface which is provided with control elements may be produced to have a specific haptic property, and another portion of the same substrate which comprises the hob zones may be produced to have a different haptic property.

Therefore, the haptic perception of a coated portion of a surface may be clearly distinguishable from an uncoated surface portion of the same area.

The texturing particles may preferably be formed to have a specific outer contour. For example, texturing particles may be formed to have a substantially edgeless, rounded outer contour. Due to its rounded edgeless outer contour, so formed particles may cause a velvety perception of a layer. The velvety perception is caused by portions of the texturing particle that protrude or project from the applied layer. In other words, rounded portions of the texturing particles which are not fully embedded in the layer, cause a velvety haptic perception.

More preferably, the rounded edgeless outer contour of the texturing particle is not altered by a subsequent process, such as a burning-in process. For example a fracture of the rounded edgeless texturing particles is to be avoided. In particular, the texturing particle for producing a layer with a velvety perception should not have sharp edges, since such edges will not result in velvety haptics.

Advantageously, therefore, to produce a layer having a velvety feel, the outer contour of the texturing particle is not altered by the temperature of the burning-in process. Preferably, the texturing particle therefore has a melting point above a burning-in temperature of the layer or the layer-forming material, so that the texturing particles embedded in the layer retain their outer contours and so may cause the velvety haptic property of the layer. Therefore, preferably, the softening range of the texturing particles is above 1000° C.

To produce a layer with rough and/or "braking" haptic properties, the texturing particles may preferably be formed with a polygonal outer contour.

Such polygonal particles in a layer may cause a rough perception, due to the points and/or edges thereof.

It is particularly preferred for the texturing particles to have an outer contour with edges or points following burning-in of the layer-forming material. This may be achieved for example by particles having an edged and/or polygonal outer contour. However, surprisingly simple, it is also possible to choose spherical or edgeless texturing particles of a material that has its softening range below the burning-in temperature of the layer-forming material.

Preferably, for this purpose, texturing particles of alkali alumosilicate glass or low-alkali borosilicate glass are selected, which have a spherical or edgeless outer contour and which partially melt during burning-in, thereby forming fragments of the spheres. Such materials for example exhibit a softening range of Tg=620° C., and 525° C., respectively. If the burning-in temperature is above this temperature, fragments with edges and points may be formed from the particles. These may protrude from the surface of the applied layer. The protruding points and edges of the fragments of the texturing particles may therefore cause a rough haptic perception.

Mixtures of round and polygonal texturing particles may also preferably be used. In this manner, the haptic effect may be adjusted between a more velvety and a rather rough effect.

The texturing particles preferably have a diameter in a range from 500 nm to 50 μm, preferably from 1 to 10 μm, and more preferably from 1.5 to 7 μm.

The proportion of the texturing particles having this preferred diameter may preferably amount to 90% of the total texturing particles used, and more preferably to more than 95%.

In order to produce a layer with haptic properties, the texturing particles may preferably be formed with a spherical and/or edgeless outer contour.

The texturing particles may preferably comprise materials selected from the group comprising $SiO_2$, polysiloxane, methylpolysiloxane, methylphenylpolysiloxane, organically functionalized polysiloxane, low-alkali borosilicate and/or alkali aluminosilicate glasses.

In a specific embodiment, the texturing particles may also comprise materials selected from the group of non-oxide ceramics, such as BN, SiN, MoS, TiN, or ZrN.

In another specific embodiment, the texturing particles may comprise oxide materials, such as $Al_2O_3$, crystalline $SiO_2$, $ZrO_2$, $ZrSiO_4$, $ZnAl_2O_4$, $MgAl_2O_4$, $Y_2O_3$, yttrium-doped $ZrO_2$, calcium-doped $ZrO_2$, magnesium-doped $ZrO_2$, $TiO_2$, ZnO.

The preferred particle size of the texturing particles of selected materials for producing a layer with specific haptic properties is shown in the table below:

TABLE 1

Preferred particle sizes of texturing particles

| Material | Particle Size | Proportion |
|---|---|---|
| Methylpolysiloxane spheres | diameter: 4-5 µm | |
| Methylpolysiloxane spheres (Tospearls ®) | diameter: 4-8 µm | |
| $SiO_2$ spheres | diameter: 3-4 µm | |
| $SiO_2$ spheres | diameter: 3-7 µm | |
| $SiO_2$ spheres | diameter: 8-12 µm | |
| Low-alkali borosilicate glass spheres (W210, 3M) | 12 µm | 95% |
| | 9 µm | 90% |
| | 3 µm | 50% |
| | 1 µm | 10% |
| Alkali alumosilicate glass spheres (W410, 3M) | 24 µm | 95% |
| | 15 µm | 90% |
| | 4 µm | 50% |
| | 1 µm | 10% |
| Alkali alumosilicate glass spheres | 44 µm | 95% |
| | 28 µm | 90% |
| | 10 µm | 50% |
| | 1 µm | 10% |

The glass frit according to the disclosure which comprises glass flow forming and texturing particles may additionally include added pigments, fillers, or additives. These may for example be coloring pigments. Preferably, temperature-stable inorganic pigments may be used, which are known for enamel coatings for cooktops and for glass coatings. These may include, for example, $TiO_2$, spinels, CrCu spinels, Fe spinels, mica, mica-based effect pigments, for example with $SiO_2$ and/or $TiO_2$ and/or $Fe_2O_3$ and/or $SnO_2$-based coatings.

The mass fraction of these pigments, in particular coloring pigments, of the total mass of the glass flow forming pigments may range from 1 to 60 wt. %, preferably from 3 to 40 wt. %, and more preferably from 5 to 30 wt. %.

The disclosure further relates to the production of a paste using the glass frit, for glazing, enameling or decorating a substrate surface or a partial area of a substrate surface. The glass frit may be used to produce a paste, and a pasting agent may be used to this end, including an organic and/or inorganic pasting agent.

The mass fraction of the pasting agent in the total mass of the paste may range from 30 to 90 wt. %, preferably from 45 to 80 wt. %, and more preferably from 53 to 68 wt. %.

Pasting agents that may be used are known high-boiling screen printing oils, for example from tree resin mixtures. Advantageously, it is also possible to use UV curable screen printing media. Preferably, solvent-free screen printing pastes may be used.

In a particular embodiment, organic and/or inorganic pasting substances may be added to the screen printing pastes, comprising cellulose, hydroxy propyl cellulose, xanthan gum, polyvinylpyrrolidone, polyethylene glycol, polyvinyl alcohol, or polydispersed silica. Thereby, the viscosity of the paste may be modified and optimized.

The disclosure further relates to a method for producing a layer with haptic properties using a paste as described above.

Producing a layer with haptic properties on a substrate surface or a portion of a substrate may be achieved by applying the paste onto the substrate and subsequent burning-in.

Application of the paste onto the substrate may be accomplished by liquid coating processes, such as by spraying, dipping, knife coating, brushing, by means of pad printing, or using decals.

Preferably, application is achieved by screen printing. Screen printing fabrics that have proven to be particularly suitable include those with a thread count from 100 to 140 per centimeter.

In another preferred embodiment, application is achieved using decals. This method may be particularly suitable when using non-planar substrates, such as curved chimney viewing windows.

Burning-in may comprise an initial drying or curing process. This process may be accomplished thermally, for example, by circulating air, or by drying using infrared radiation. Preferably the temperature ranges from 100 to 250° C., more preferably from 120 to 200° C. In a specific embodiment, curing of the applied layer may be achieved using short-wave UV radiation.

Furthermore, burning-in may preferably comprise a temperature process in which the glass frit can be melted. This temperature process may be performed at temperatures ranging from 400 to 1000° C., preferably from 600 to 850° C., and more preferably from 750 to 830° C.

In a particularly preferred embodiment, burning-in may be accomplished during a ceramizing process, for example during manufacturing of a glass ceramic substrate used as a cooktop or a fireplace viewing window. This enables to perform burning-in of the applied layer in a very simple and cost efficient manner.

In another preferred embodiment, burning-in may be accomplished during secondary burning-in.

Moreover, burning-in may also be accomplished during shaping of the substrate at an appropriate elevated temperature, for example during bending of the substrate. Also, burning-in may be achieved during a thermal tempering process.

In a specific embodiment of the disclosure, when an organic layer forming material is used for the texturing particles, burning-in of the layers is performed at a temperature below 200° C.

In another specific embodiment of the disclosure, when a polysiloxane-based and/or sol-gel-based layer forming matrix is used for the texturing particles, burning-in of the layers is performed at a temperature from 200° C. to 700° C., preferably from 230 to 500° C., most preferably from 270 to 400° C.

The layer with haptic properties produced on the surface or on a partial area of the surface of the substrate may have an average layer thickness from 1 to 50 µm, preferably from 2 to 25 µm, and more preferably from 2 to 10 µm. In another embodiment, the average layer thickness is from 3 to 5 µm.

In a preferred embodiment, the texturing particles are embedded into the layer both partly without as well as with intermediate crystallization layers.

In another preferred embodiment, the texturing particles are only partially covered by the melted layer. In other words, a portion of some of the texturing particles may protrude or project from the surface of the produced layer. The outer contour of the projecting portions of the texturing particles and their number may have a significant influence on the haptic properties of the layer. For example, protruding rounded and/or edgeless texturing particles may cause velvety haptics, whereas protruding texturing particles with edges and/or points may cause rough haptics.

In another embodiment, the texturing particles may be completely embedded in the layer.

In one preferred embodiment, the glass flow forming particles are completely or almost completely melted in the produced layer. The meso- and/or micro-porosity of the layer may be less than 1 vol. %.

In another embodiment, the glass flow forming particle is only partially melted. The layer so produced may exhibit a meso- to micro-porosity with pores having pore radii in a range from 20 to 1000 nm. This embodiment may be particularly advantageous in terms of a high substrate strength.

The degree of surface occupancy of the produced layer visible in a plan view, for instance by means of a scanning electron microscope or an optical microscope, may amount to more than 5%, preferably more than 20%, and more preferably more than 30%. In case of spherical texturing particles, the maximum possible occupancy corresponds to the closest packing of spheres.

However, if the layer thickness of the matrix, or of the layer-forming material, is larger than the mean particle diameter of the texturing particles, the real surface which may be occupied by the particles without matrix on the substrate surface is larger than the surface directly visible to the microscope.

This real degree of surface occupancy of the texturing particles in the produced layer may be more than 10%, preferably more than 25%, and more preferably more than 40%.

In the haptic layer, the volume ratio of matrix, or layer-forming material, to texturing particles may be greater than 0.1, preferably greater than 0.2, most preferably greater than 0.4.

The surface roughness values of the produced layer may range from Ra=0.2 to Ra=1.2 µm. The following table shows the roughness of a layer produced on a glass ceramic substrate using different mass fractions of texturing particles relative to glass flow forming particles. Distinction is made between a produced layer with velvety haptics (layer A), and a produced layer with rough haptics (layer B).

The mass ratio given in the table refers to the ratio of glass flow forming particles to texturing particles in the glass frit.

TABLE 2

| Surface roughness values of selected layers, with: | | | | | | |
|---|---|---|---|---|---|---|
| Sample | PV [µm] | Std. dev. | RMS [µm] | Std. dev. | Ra [µm] | Std. dev. |
| untreated substrate, glass ceramic material | 0.55 | 0.05 | 0.07 | 0.01 | 0.06 | 0.01 |
| pigmented top decor, layer A | 3.55 | 0.73 | 0.29 | 0.03 | 0.21 | 0.02 |
| pigmented top decor, layer B, with texturing particles for velvety haptics | 9.69 | 1.27 | 0.99 | 0.05 | 0.69 | 0.04 |
| transparent glass flow forming particles without texturing particles and without pigments | 3.51 | 0.48 | 0.33 | 0.03 | 0.22 | 0.02 |
| transparent glass flow forming particles with texturing particles for velvety haptics, with mass ratio of 19 | 4.54 | 0.46 | 0.52 | 0.03 | 0.42 | 0.02 |
| transparent glass flow forming particles with texturing particles for velvety haptics, with mass ratio of 9 | 4.99 | 0.90 | 0.52 | 0.04 | 0.41 | 0.02 |
| transparent glass flow forming particles with texturing particles for velvety haptics, with mass ratio of 5.7 | 5.54 | 1.27 | 0.52 | 0.05 | 0.39 | 0.04 |
| transparent glass flow forming particles with texturing particles for velvety haptics, with mass ratio of 1.5 | 8.75 | 1.22 | 0.90 | 0.06 | 0.67 | 0.04 |
| transparent glass flow forming particles with texturing particles for velvety haptics, with mass ratio of 1.2 | 8.90 | 1.62 | 1.15 | 0.02 | 1.01 | 0.02 |
| transparent glass flow forming particles with texturing particles (layer A) for rough haptics, with mass ratio of 19 | 9.13 | 1.47 | 0.44 | 0.05 | 0.32 | 0.03 |
| transparent glass flow forming particles with texturing particles (layer A) for rough haptics, with mass ratio of 9 | 11.10 | 1.57 | 0.55 | 0.06 | 0.40 | 0.04 |
| transparent glass flow forming particles with texturing particles (layer A) for rough haptics, with mass ratio of 5.7 | 11.27 | 2.44 | 0.57 | 0.04 | 0.41 | 0.02 |
| transparent glass flow forming particles with texturing particles (layer A) for rough haptics, with mass ratio of 1.5 | 13.76 | 1.45 | 1.17 | 0.06 | 0.82 | 0.05 |
| transparent glass flow forming particles with texturing particles (layer A) for rough haptics, with mass ratio of 1.2 | 13.01 | 1.16 | 1.27 | 0.07 | 0.87 | 0.04 |

TABLE 2-continued

Surface roughness values of selected layers, with:

| Sample | PV [μm] | Std. dev. | RMS [μm] | Std. dev. | Ra [μm] | Std. dev. |
|---|---|---|---|---|---|---|
| transparent glass flow forming particles with texturing particles (layer B) for rough haptics, with mass ratio of 19 | 11.33 | 0.98 | 0.45 | 0.04 | 0.30 | 0.03 |
| transparent glass flow forming particles with texturing particles (layer B) for rough haptics, with mass ratio of 9 | 11.73 | 2.15 | 0.52 | 0.06 | 0.35 | 0.04 |
| transparent glass flow forming particles with texturing particles (layer B) for rough haptics, with mass ratio of 5.7 | 12.34 | 1.90 | 0.58 | 0.05 | 0.40 | 0.04 |
| transparent glass flow forming particles with texturing particles (layer B) for rough haptics, with mass ratio of 1.5 | 13.79 | 1.42 | 1.30 | 0.05 | 0.86 | 0.05 |
| transparent glass flow forming particles with texturing particles (layer B) for rough haptics, with mass ratio of 1.2 | 13.90 | 2.16 | 1.35 | 0.10 | 0.88 | 0.08 |

Ra = arithmetic mean roughness
RMS = root mean squared roughness
PV = peak-to-valley value as measured by white light interference microscope.

Typical static and dynamic friction values of selected layers are listed in the table below.

The mass ratio given in the table refers to the ratio of glass flow forming particles to texturing particles in the glass frit.

TABLE 3

Static and dynamic friction values of selected layers

| Sample | Dynamic Friction Value largest mean | | Static Friction Value mean | |
|---|---|---|---|---|
| | mean | spread | mean | spread |
| untreated substrate, glass ceramic material | 0.29 | 0.08 | 0.94 | 0.10 |
| pigmented top decor, layer A | 0.43 | 0.05 | 0.62 | 0.06 |
| pigmented top decor, layer B | 0.54 | 0.08 | 0.71 | 0.09 |
| pigmented top decor, layer B, with texturing particles for velvety haptics | 0.50 | 0.01 | 0.88 | 0.09 |
| transparent glass flow forming particles without texturing particles and without pigments | 0.35 | 0.08 | 0.88 | 0.09 |
| transparent glass flow forming particles with texturing particles for velvety haptics, with mass ratio of 19 | 0.40 | 0.06 | 0.64 | 0.10 |
| transparent glass flow forming particles with texturing particles for velvety haptics, with mass ratio of 9 | 0.34 | 0.02 | 0.65 | 0.06 |
| transparent glass flow forming particles with texturing particles for velvety haptics, with mass ratio of 5.7 | 0.30 | 0.02 | 0.69 | 0.09 |
| transparent glass flow forming particles with texturing particles for velvety haptics, with mass ratio of 1.5 | 0.51 | 0.01 | 0.78 | 0.07 |
| transparent glass flow forming particles with texturing particles for velvety haptics, with mass ratio of 1.2 | 0.45 | 0.03 | 0.82 | 0.09 |
| transparent glass flow forming particles with texturing particles (variation A) for rough haptics, with mass ratio of 1.5 | 0.51 | 0.02 | 0.94 | 0.05 |
| transparent glass flow forming particles with texturing particles (layer A) for rough haptics, with mass ratio of 1.2 | 0.55 | 0.04 | 1.04 | 0.13 |
| transparent glass flow forming particles with texturing particles (layer B) for rough haptics, with mass ratio of 1.5 | 0.55 | 0.01 | 0.95 | 0.08 |
| transparent glass flow forming particles with texturing particles (layer B) for rough haptics, with mass ratio of 1.2 | 0.56 | 0.01 | 0.91 | 0.13 |

Measurement Methods Used:

For determining the particle filling degree, visual counting of the particles was accomplished in light microscope images at a 100-fold magnification at 10 different measuring sites.

The friction coefficient was determined by physical "inclined plane" test.

The dynamic friction coefficient was measured using a tribometer, at a speed of 0.05 cm/s, load: 1 N, counter-body with leather, covered finger with a diameter of 10 mm.

The adhesive strength of the produced layer is very high. The adhesive strength of the produced layer may be determined by adhering a strip of transparent adhesive film (Tesafilm type 104, Beiersdorf) and jerkily pulling it off, and by analyzing the amount of adhering particles on the adhesive film after it has been pulled off.

For the produced layers, no or only a few adhering particles, non-critical for practical application, were determined.

Moreover, chemical and mechanical resistance of the produced layer is very high. It may be further increased by a higher percentage of texturing particles.

Mechanical scratch resistance may for example be tested by the Bosch and Siemens Home Appliances test known to persons skilled in the art. In this scratch test using a silicon carbide point, scratch resistances obtained for the inventive layers are greater than 800 g, preferably greater than 1000 g, most preferably greater than 1300 g.

The layers with haptic properties according to the disclosure meet all soft, chemo-, mechanical, abrasion, and hand abrasion tests known in the art in compliance with: DIN EN 60068-2-70/IEC 68-2-70, BMW GS 97034/GS 97045, DaimlerChrysler DBL 7384, Ford WSS-M2P188-A1.

Fingerprint unobtrusiveness as compared to an uncoated substrate surface was tested using a synthetic sweat solution and methods known in the art in accordance with DIN 53160-2:2001 BMW GS 97045-2, DBL 73084, and VW TL 226.

The produced layer is in particular chemically resistant to acidic contact media, such as citric acid, acetic acid. It also exhibits high resistance to alkalis, for example to alkaline cleaners.

Moreover, the produced layer is easy to clean and is insensitive to "fingerprints".

The produced layer is moreover distinguished by high thermal stability up to temperatures around 900° C.

Its mechanical resistance to mechanically acting cleaners such as scouring pads or glass ceramic scrapers is very high.

The substrate may comprise materials from the group of glass ceramics, high-strength glasses, soda-lime glasses, borosilicate glasses, and/or aluminosilicate glasses.

Substrates preferably used are transparent and/or bulk colored and/or partially coated glass or glass ceramic substrates. Thermally and/or chemically tempered glasses may also be used as a substrate.

Particularly preferred are those substrate glasses that are used in the white goods and household appliances sectors, for example in baking and cooking appliances, refrigerators, steam cookers, control panels for such devices, gas cooking appliances, sinks, or dishwashers.

Substrates that are likewise preferably used are high-strength glasses which are employed for electrical and electronic devices, for example in mobile phones, computers, touch displays, and TVs.

Also, high-strength glasses which are employed in different functions in the vehicle and aircraft, railway, and shipbuilding sectors may likewise be used as substrates.

In one preferred embodiment, soda-lime glasses and/or borosilicate glasses and/or aluminosilicate glasses and/or reduced iron glasses are used as the substrate.

Thin glasses with a thickness from 30 µm to 2 mm may also be used.

The substrates may have a planar or bent, curved or other shape.

The substrates may have machined or etched surfaces.

The layer may be applied to the surface of a substrate or on a partial area thereof. It is also possible to apply a plurality of layers with different haptic properties on a substrate. For example, one section of a substrate surface may have control functions and may be provided with a layer that causes a velvety haptic perception, whereas another section of the same substrate surface accomplishes cooking functions and is advantageously provided with a layer that causes a rough haptic perception.

For example, transparent glass ceramic substrates with or without a bottom coating may be used, which can be employed as a cooktop.

Further details of the disclosure will become apparent from the description of the illustrated embodiments and the appended claims.

DETAILED DESCRIPTION

The following table summarizes various glasses according to the disclosure for producing the glass flow forming particles, and the composition thereof.

TABLE 4

Composition of inventive glasses in wt. %

| Wt. % | Glass A | Glass B | Glass C | Glass D | Glass E | Glass F |
|---|---|---|---|---|---|---|
| $SiO_2$ | 44-57 | 53-63 | 57-62 | 47-52 | 40-50 | 63-73 |
| $Al_2O_3$ | 5-25 | 15-25 | 5-8 | 2-6 | 9-15 | 0-7 |
| $B_2O_3$ | 0-27 | 15-22 | 18-23 | 17-21 | 10-15 | 12-29 |
| $Li_2O$ | 0-10 | 2-7 | 2-6 | 3-5 | 0-4 | 0-6 |
| $Na_2O$ | 0-10 | 0-1 | 0-1 | 1-5 | 1-4 | 0-8 |
| $K_2O$ | 0-10 | 0-1 | 0-4 | 5-10 | 0-3 | 0-8 |
| CaO | 0-4 | 1-4 | 1-2 | 0-2 | 0-3 | 0-5 |
| MgO | 0-3 | 1-4 | 0-2 | 0-1 | 0-3 | 0.1-5 |
| BaO | 0-4 | 0-1 | 0-2 | 0-2 | 16-24 | 0-5 |
| SrO | 0-4 | 1-4 | 0.5-2 | 0-1 | 0-2 | 0-4 |
| ZnO | 0-15 | 1-4 | 0-2 | 0-3 | 8-15 | 0-15 |
| $TiO_2$ | 0-3 | 0-1 | 0-2 | 0-2 | 0-3 | 0-5 |
| $ZrO_2$ | 0-7 | 1-4 | 2-5 | 0-2 | 0-4 | 0-5 |
| $As_2O_3$ | 0-1 | 0-1 | 0-1 | 0-1 | 0-1 | 0-1 |
| $Sb_2O_3$ | 0-15 | 0-1 | 0-1 | 0-1 | 0-15 | 0-1 |
| F | 0-3 | 0-1 | 0-1 | 0-1 | 0-1 | 0-1 |
| $H_2O$ | 0-5 | 0-3 | 0-3 | 0-3 | 0-3 | 0-3 |

Other glasses according to the disclosure for producing glass flow forming particles, which are mainly used for producing haptic layers on glasses, in particular on soda-lime glasses, are summarized in Table 5:

| Wt. % | Glass G | Glass H | Glass I | Glass J | Glass K |
|---|---|---|---|---|---|
| $SiO_2$ | 25-55 | 35-65 | 30-54 | 6-20 | 6-15 |
| $Al_2O_3$ | 3-18 | 0 | 0-17.5 | 0-5 | 0 |
| $B_2O_3$ | 5-25 | 0 | 13-28 | 20-38 | 20-28 |
| $Li_2O$ | 0-12 | 0-6 | 3-6 | 0 | 0 |
| $Na_2O$ | 3-18 | 0-6 | 4-10 | 0 | 0 |
| $K_2O$ | 3-18 | 0-6 | 0-2 | 0 | 0 |
| CaO | 3-17 | 0-12 | 0-6 | 0 | 0 |
| MgO | 0-10 | 0-12 | 0-4 | 0 | 0 |
| BaO | 0-12 | 0-38 | 0 | 0 | 0 |
| SrO | 0 | 0-16 | 0-4 | 0 | 0 |
| ZnO | 0 | 17.5-38 | 3-13 | 35-70 | 58-70 |
| $TiO_2$ | 0-5 | 0 | 0-2 | 0-5 | 0 |
| $ZrO_2$ | 0-3 | 0 | 0-2 | 0-5 | 0 |
| $Bi_2O_3$ | 0 | 0 | 0 | 0-20 | 0 |
| CoO | 0 | 0 | 0 | 0-5 | 0 |
| $Fe_2O_3$ | 0 | 0 | 0 | 0-5 | 0 |
| MnO | 0 | 0 | 0 | 0-10 | 0.5-1 |
| $CeO_2$ | 0 | 0 | 0 | 0 | 0-3 |
| F | 0 | 0 | 0-3.3 | 0-6 | 0 |

The glasses were melted and were ground when cooled down, to produce a glass flow forming particle.

Then the glass flow forming particles were mixed with the texturing particles, to produce the glass frit according to the disclosure. By adding screen-printing oils, pastes were prepared, which were applied onto lithium alumosilicate glass ceramic substrates by screen printing. Burning-in of the applied paste was accomplished during ceramization.

Figure 1:
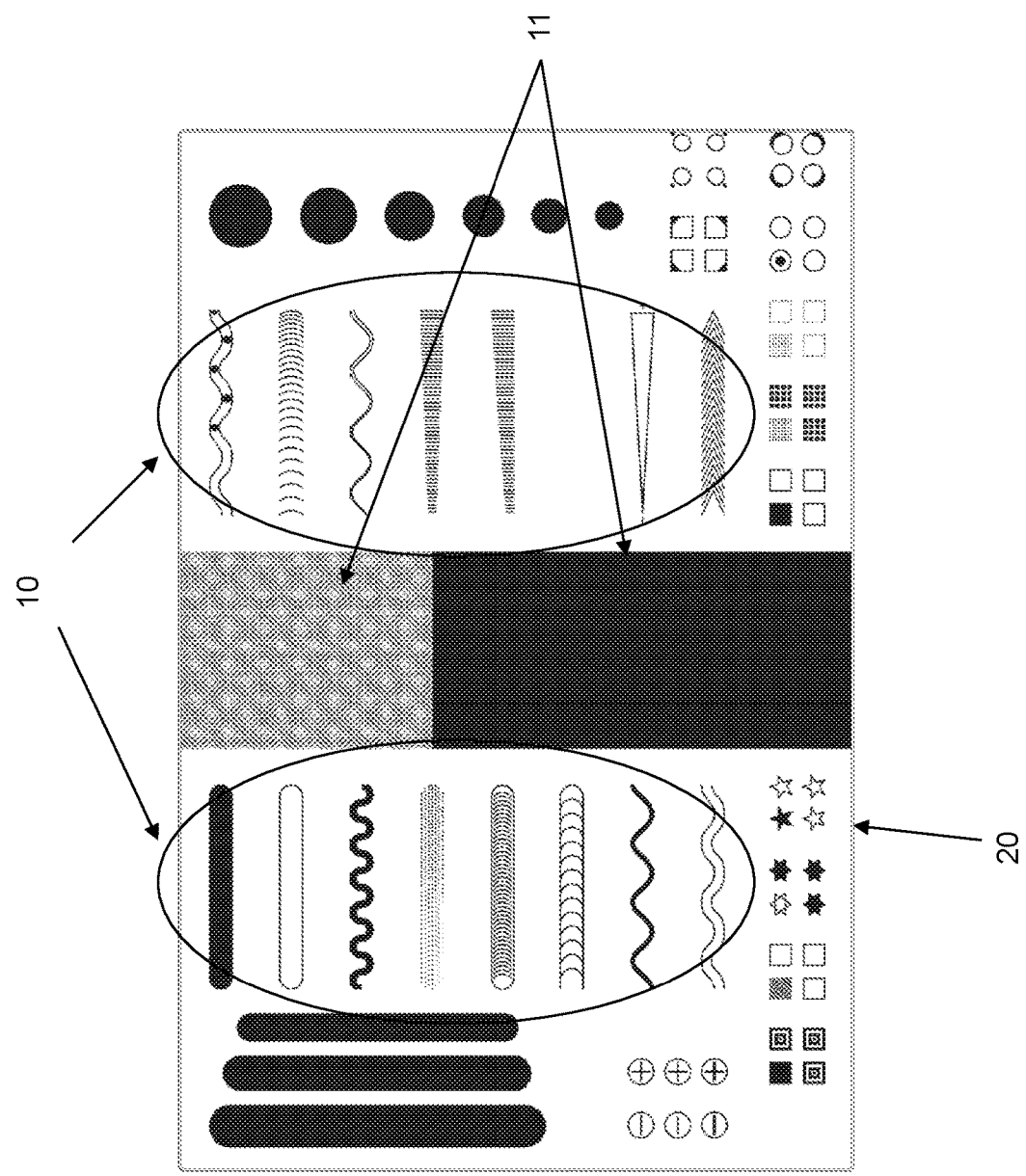
FIG. 1 shows embodiments of locally patterned haptic layers.

FIG. 1 shows various possible embodiments of locally patterned haptic layers on a substrate 20. Without being limited to the specific embodiment of FIG. 1, the substrate may in particular comprise a glass or glass ceramic kitchen element, wherein the layer with texturing particles is a printing on the kitchen element. In particular, the layer is suitable for a local or full-area printing on a bulk colored and/or color-coated glass ceramic cooktop, for radiation heaters and/or induction cookers.

In FIG. 1 the areas identified by 10 illustrate embodiments of slide switches which are designed with touch sensitivity. Sections 10 of the substrate surface with the touch-sensitive slide switches were produced with a layer that causes a velvety haptic perception.

The sections of the substrate surface denoted by 11 illustrate two areas that have been provided with a layer that produces a rough haptic perception. These functional areas are formed as cooking hobs, the rough haptic perception being advantageous due to the better static friction thereof.

Figure 2:
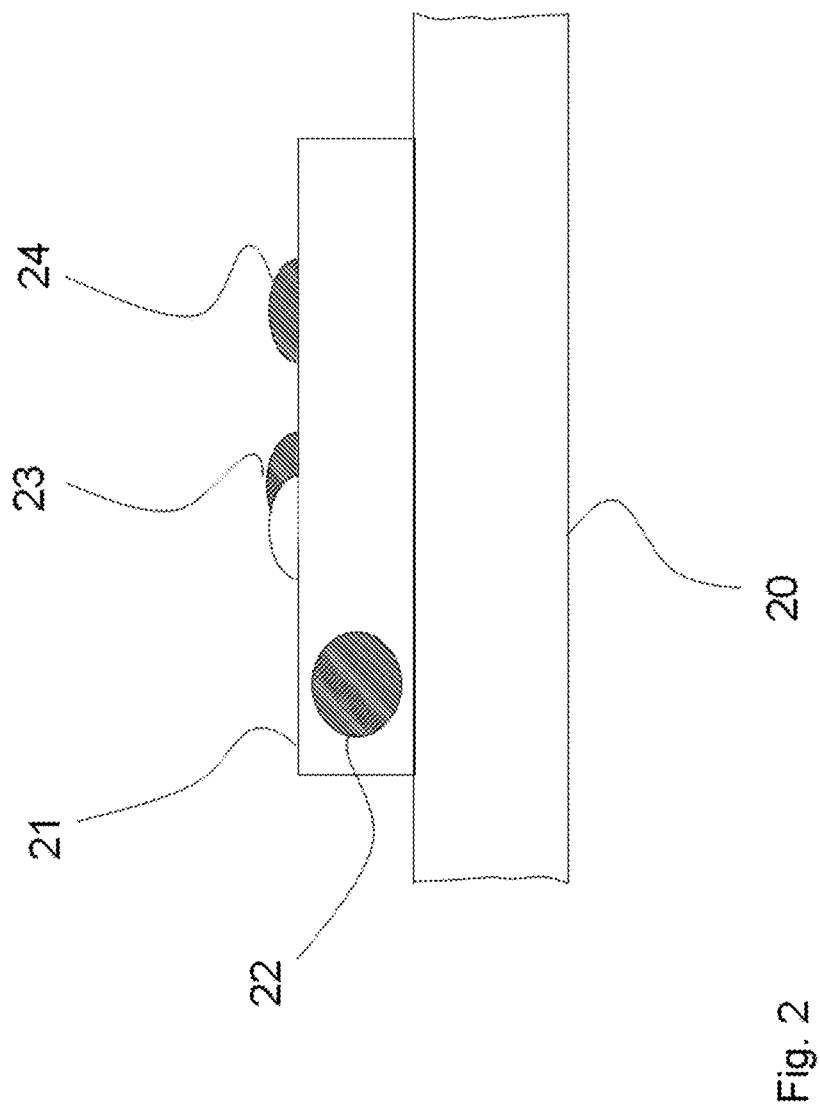
FIG. 2 shows a layer having a velvety haptic perception.

FIG. 2 shows a layer 21 on a transparent substrate 20. Spherical texturing polymethylsiloxane particles did not or not significantly alter their outer contours during application and burning-in since they have a very high melting point above the burning-in temperature. Therefore, they may be present as particles 22 fully embedded in the layer, or as only partially embedded particles 24. Furthermore, a portion thereof may be covered by the layer, so that one surface portion of particle 23 is free of glass. Such a layer with a homogeneous distribution of the texturing particles in terms of the height and width of the spherical outer contour causes a velvety haptic perception.

Figure 3:
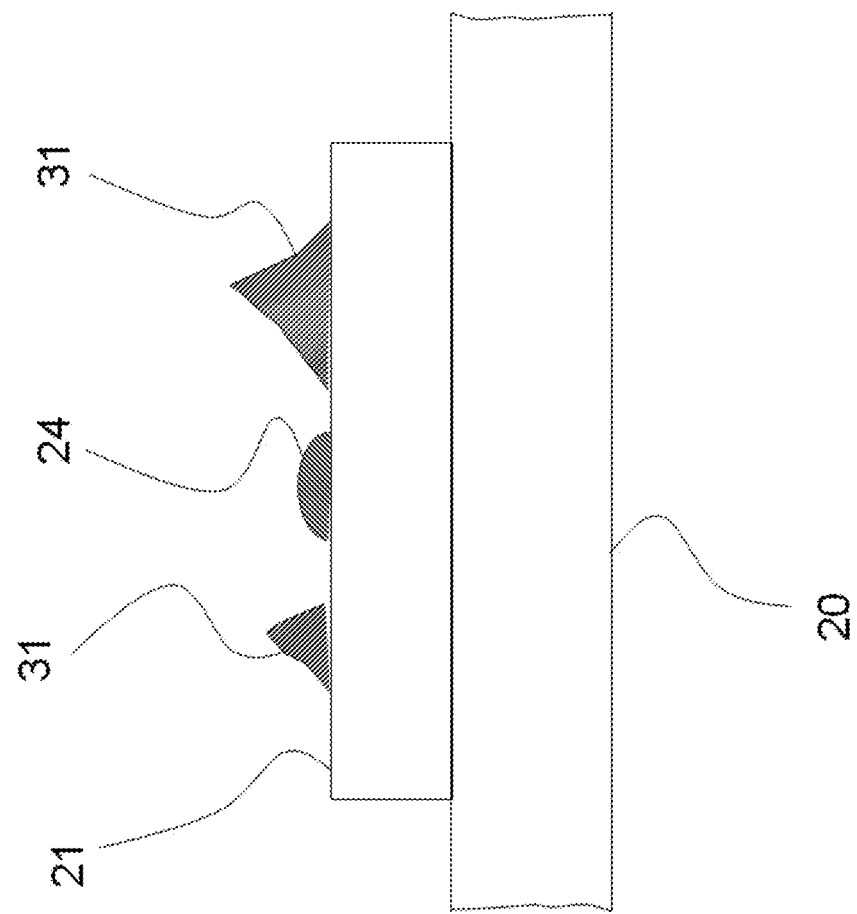
FIG. 3 shows a layer having a rough haptic perception.

FIG. 3 illustrates a layer in which both texturing particles with a melting point above the burning-in temperature and texturing particles with a lower softening temperature were used, for example particles of alkali alumosilicate glass or low-alkali borosilicate glass. For the texturing particles of the lower softening point, partial melting occurs during burning-in, so that fragments are formed.

Portions of fragments 31 protrude from the layer as a point and cause a rough haptic perception.

Figure 5:
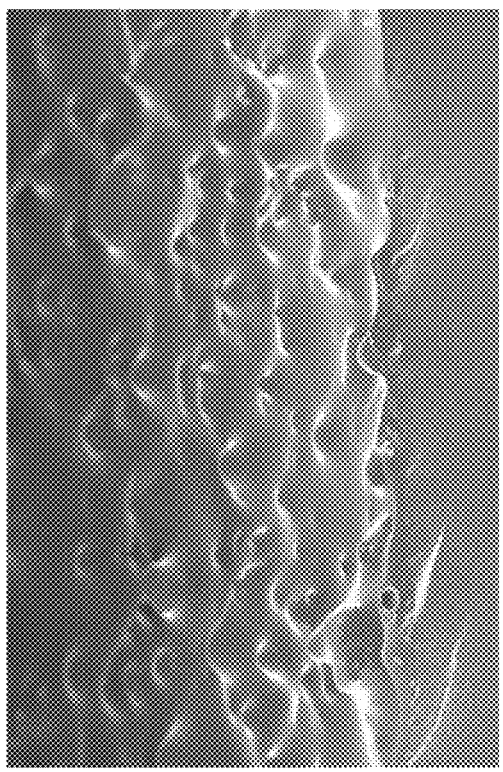
FIG. 5 shows a cross-sectional SEM image of a layer with a rough haptic perception.
Figure 4:
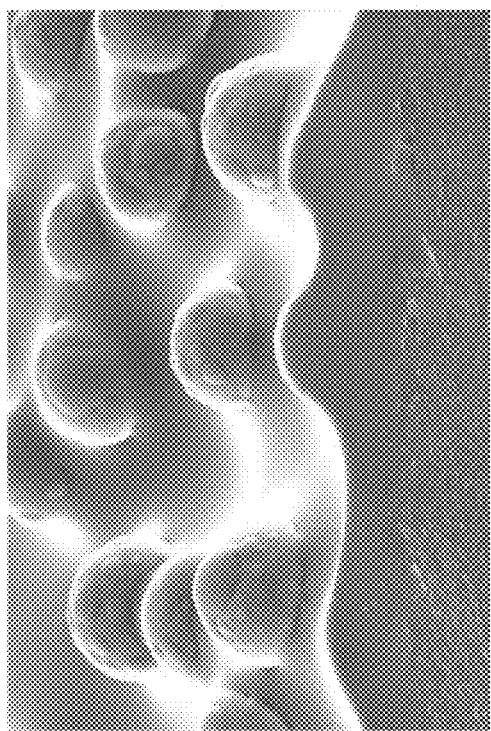
FIG. 4 shows a cross-sectional SEM image of a layer with a velvety haptic perception.

FIG. 4 shows a scanning electron micrograph of a layer with a velvety haptic perception, and FIG. 5 illustrates a layer with a rough haptic perception, in cross section.

EXAMPLE 1

Preparation of a Layer with Velvety Haptics 19 g of glass flow forming particles of a ground glass C are mixed with 61.5 g of screen printing pasting medium and 19 g of texturing homogeneous spherical methylpolysiloxane particles with a mean particle size of 4.5 µm. The so produced paste is homogenized for 10 min using a Dispermat®.

Then, textured layers are applied on green glass by screen printing using a 140 mesh screen. The so applied layers are dried at a temperature of 180° C. for 30 min. Burning-in is accomplished at 900° C. during the ceramization of a bulk colored glass ceramic substrate.

In this way, haptic layers according to the disclosure are obtained with a velvety feel and good chemical and mechanical functional characteristics.

EXAMPLE 2

Preparation of a Layer with Rough Haptics
(Variation A)

17 g of glass flow forming particles of a ground glass C are mixed with 60 g of screen printing pasting medium and 14 g of texturing particles of a mixture of spheres and idiomorphous (edged) particles of alkali alumosilicate glass, with 95% thereof having a particle size of not more than 12 µm. This paste is homogenized for 10 min using a Dispermat®. Then, textured layers are applied on green glass by screen printing using a 140 mesh screen.

These layers are dried at 180° C. for 30 min. Burning-in is accomplished at about 900° C. during ceramization of the bulk colored glass ceramic.

In this way, haptic layers according to the disclosure are obtained with rough haptics and good chemical and mechanical functional characteristics.

EXAMPLE 3

Preparation of a Layer with Rough Haptics
(Variation B)

17 g of glass flow forming particles of a ground glass C are mixed with 60 g of screen printing pasting medium and 14 g of texturing particles of a mixture of spheres and idiomorphous (edged) particles of low-alkali borosilicate glass, with 95% thereof having a particle size of not more than 24 µm.

This paste is homogenized for 10 min using a Dispermat®. Then, textured layers are applied on green glass by screen printing using a 140 mesh screen. These layers are dried at 180° C. for 30 min.

Burning-in is accomplished at about 900° C. during ceramization of the bulk colored glass ceramic.

In this way, haptic layers according to the disclosure are obtained with rough haptics and good chemical and mechanical functional characteristics.

EXAMPLE 4

Preparation of a Layer with Velvety Haptics and
Anti-Fingerprint Effect and Matting Properties 19 g of glass flow particles of a ground glass frit of a glass flow composition (glass C) are mixed with 61.5 g of screen printing pasting medium and 19 g of texturing homogeneous spherical methylpolysiloxane particles with a mean particle size of 4.5 µm.

This paste is homogenized for 10 min using a Dispermat®.

Then, textured layers are applied on green glass by screen printing using a 140 mesh screen. These layers are dried at a temperature of 180° C. for 30 min.

Burning-in is accomplished at about 900° C. during ceramization of the non-bulk colored glass ceramic.

In this way, haptic layers according to the disclosure are obtained with velvety haptics, fingerprint unobtrusiveness and matting visual properties.

EXAMPLE 5

Preparation of a Layer with Velvety Haptics and
Anti-Fingerprint Effect and Matting Properties 19 g of glass flow particles of a ground glass frit (zinc borate flow, glass J) are mixed with 61.5 g of screen printing pasting medium and 19 g of texturing homogeneous spherical methylpolysiloxane particles with a mean particle size of 4.5 µm.

This paste is homogenized for 10 min using a Dispermat®.

Then, textured layers are applied on low-iron soda-lime glass of a thickness of 4 mm by screen printing using a 140 mesh screen. These layers are dried at 130° C. for 5 min.

Burning-in is accomplished at about 710° C. for 3 min during the tempering process.

In this way, haptic layers according to the disclosure are obtained with a velvety feel, fingerprint unobtrusiveness and matting visual properties.

EXAMPLE 6

Preparation of a Layer with Velvety Haptics and Anti-Fingerprint Effect and Matting Properties 70 g of a 60 mass % solution of a high-temperature stable phenyl methylpolysiloxane resin in xylene (trade name REN80, Wacker Silicones) are mixed with 19 g of texturing homogeneous spherical methylpolysiloxane particles with a mean particle size of 4.5 μm.

This screen printing paste is homogenized for 10 min using a Dispermat®.

Then, textured layers are applied on toughened low-iron soda-lime glass of a thickness of 4 mm by screen printing using a 140 mesh screen. These layers are cured at 300° C. for 1 h.

In this way, haptic layers according to the disclosure are obtained with a velvety feel, fingerprint unobtrusiveness and matting visual properties.

EXAMPLE 7

Preparation of a Layer with a Velvety Feel and Anti-Fingerprint Effect and Matting Properties 40 g of a solvent-free two-component epoxy-functionalized polysiloxane resin (Silikophon EC, by Evonic) are mixed with 19 g of texturing homogeneous spherical methylpolysiloxane particles with a mean particle size of 4.5 μm.

This screen printing paste is homogenized for 10 min using a Dispermat®.

Then, textured layers are applied on toughened low-iron soda-lime glass of a thickness of 4 mm by screen printing using a 140 mesh screen. These layers are cured at 200° C. for 60 min.

In this way, haptic layers according to the disclosure are obtained with a velvety feel, fingerprint unobtrusiveness and matting visual properties.

A comparison of the properties of two coated substrates according to the disclosure with reference samples will now be discussed below. Transparent glass ceramics has been used as a substrate for the inventive article. For a first sample, the glass ceramic was coated with a layer having a rough haptic appearance, and for a second sample with a layer having a velvety haptic appearance. The samples were compared with etched glass, with non-etched flat soda-lime glass (referred to as "SL glass" below), and with a transparent, uncoated glass ceramic. The following table shows a comparison of several visual and mechanical properties:

|  | Etched Glass | SL Glass | Transparent Glass Ceramic | Sample 1: Transparent Glass Ceramic, Rough | Sample 2: Transparent Glass Ceramic, Velvety |
|---|---|---|---|---|---|
| Transmittance [%] | 81.6 | 91.7 | 90.9 | 82.4 | 79.6 |
| Haze [%] | 95.1 | 0.3 | 0.2 | 71.8 | 84.6 |
| Gloss [%] | 6.6 | 99.9 | 99.7 | 21.2 | 25.9 |
| Static Friction | 0.69 |  | 0.79 | 0.94 | 0.82 |
| PV [μm] | 19.707 | 0.058 | 0.619 | 8.329 | 8.115 |
| RMS [μm] | 4.807 | 0.002 | 0.089 | 0.598 | 1.180 |
| Ra [μm] | 4.133 | 0.002 | 0.070 | 0.444 | 1.035 |

Figure 6:
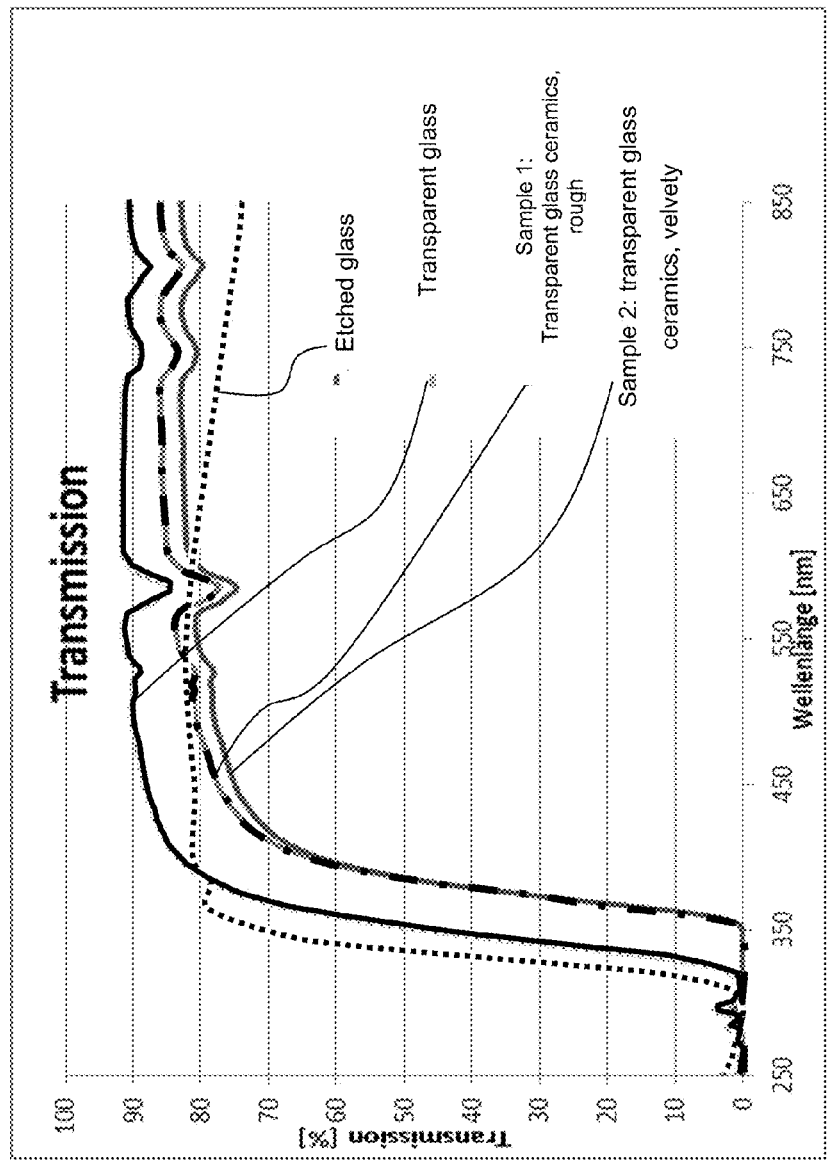
FIG. 6 shows transmission characteristics of different samples in function of the wavelength.

As can be seen from the table and from FIG. 6, the transmittance of coated samples 1 and 2 according to the disclosure is similar to that of an etched glass. Due to the light scattering resulting at the rough surface, the transmittance is lower than that of an uncoated transparent glass ceramic and of soda-lime glass.

However, the haze value and gloss of the samples according to the disclosure differ significantly from the values of an etched glass. The haze value is lower than that of etched glass, whereas the gloss value is higher. The haze value represents the portion of the reflected light that is deflected in a small solid angle range around the mirrored beam. The gloss value, by contrast, represents the portion of the light reflected along the mirrored beam. These properties result in a different visual appearance as compared to etched glass. While the latter has a rather dull appearance, the lower haze and higher gloss values of the inventive samples result in a more silky appearance.

Generally, according to one embodiment of the disclosure and supported by the exemplary values in the table, the layers can be distinguished in terms of their visual properties, by a haze value of the light reflected at the layer ranging from 65% to 90%, and/or by a gloss value ranging from 15% to 35%.

Figure 7:
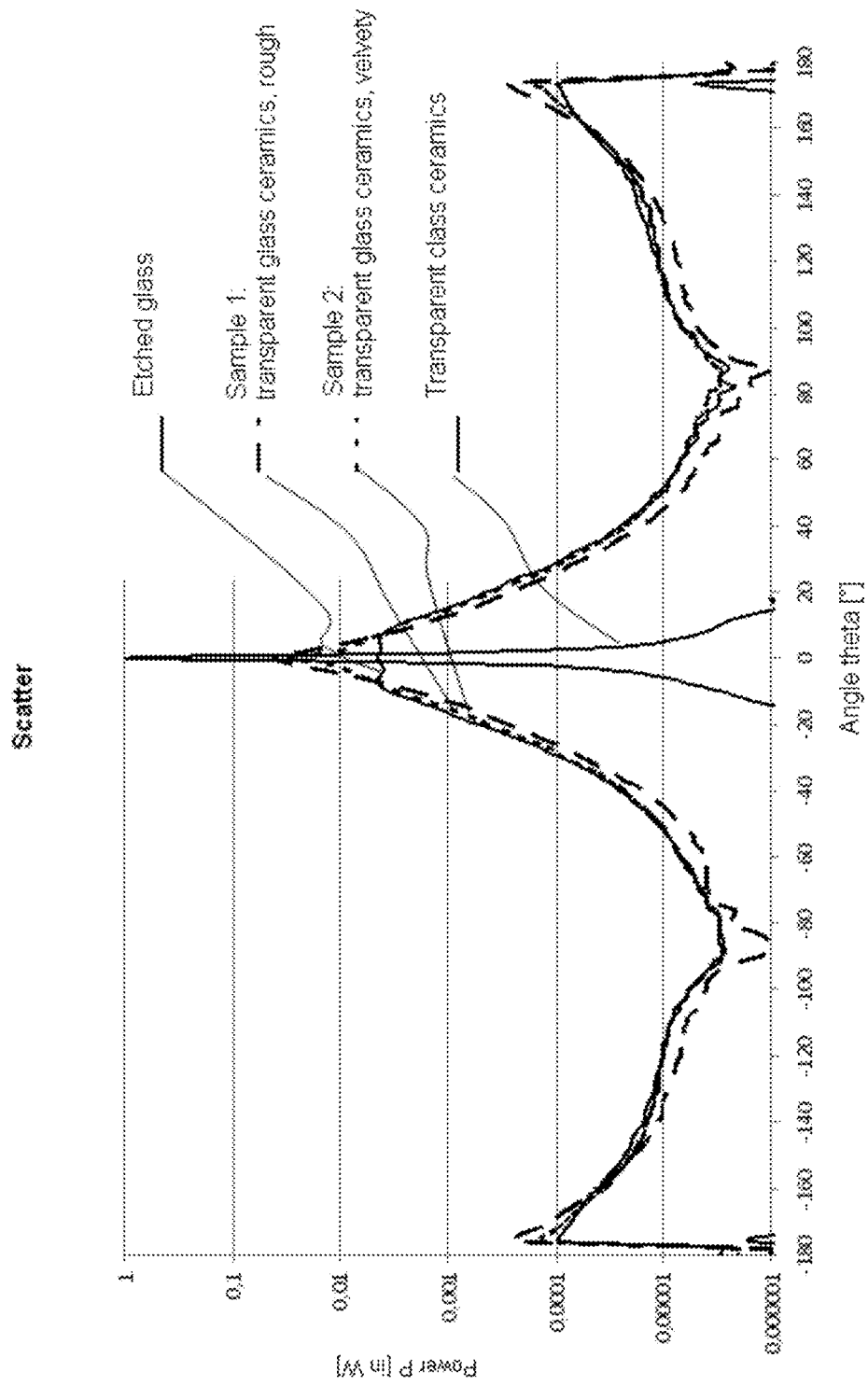
FIG. 7 shows angle-dependent light scattering of different samples.

As can be seen from FIG. 7, the curves of scattering in function of the scattering angle for samples 1, 2 and the etched glass do not differ clearly in a wide range of angles, so that the visual appearance of substrates according to the disclosure under diffusely scattered light is quite similar to that of an etched glass. However, there are significant differences at small scattering angles. The curve of the etched glass has a plateau in the range of about ±15°. For samples 1 and 2 according to the disclosure, by contrast, the light intensity continues to significantly increase as the scattering angle decreasing, and in this regard it is similar to the scattering curve of an uncoated glass ceramic. It should also be noted here, that the intensity scale in FIG. 7 is logarithmic.

This property is advantageous, when illuminating display elements such as LED operation displays are arranged below a coated area of a substrate according to the disclosure. Both legibility and sharpness of the display are substantially preserved through the layer. In contrast, the light transmitted through an etched glass, is evenly scattered in a range of ±10°, so that the visibility of the contours of a display is at least severely restricted.

Therefore, according to one modification of the disclosure, without being limited to the exemplary embodiments, a device is provided which comprises a coated substrate according to the disclosure, and an illuminating display is provided on one surface of the substrate, and at least the surface area of the substrate opposite to and facing away from the display, is provided with a layer having haptic properties. In particular, this may again be a glass ceramic cooktop comprising a transparent glass ceramic panel which has an upper surface coated with the layer according to the disclosure, and wherein a display element is arranged below or at the lower surface of the glass ceramic panel, so that the display element when in operation shines through the layer on the upper surface.

According to yet another embodiment of the disclosure, the property of the layer to deflect a greater proportion of light intensity transmitted through the substrate to small scattering angles, as compared to etched glass, may be quantified as follows: The ratio of the intensity of light, which is transmitted through the substrate and the layer and passes at an angle of 0° (i.e. of the non-scattered light), to the intensity of light which is transmitted through the substrate and the layer and is scattered in an angle of 10°, is at least 2, preferably at least 5. For comparison, and as can be seen in FIG. 7, this ratio is approximately 1 for the etched sample. That means, in this case the intensity of the light scattered at 10° is almost the same as that of the light transmitted at 0°.

Figure 9:
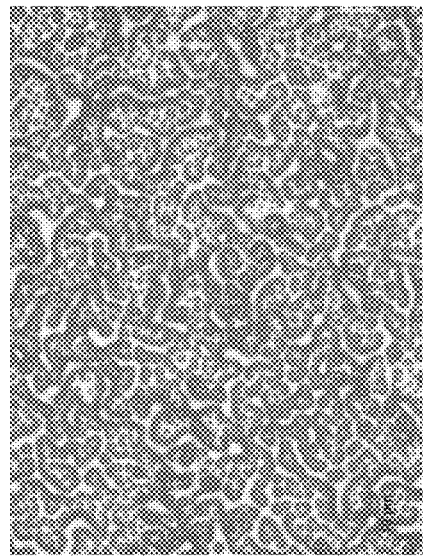
FIGS. 8 through 10 show optical micrographs of samples.
Figure 10:
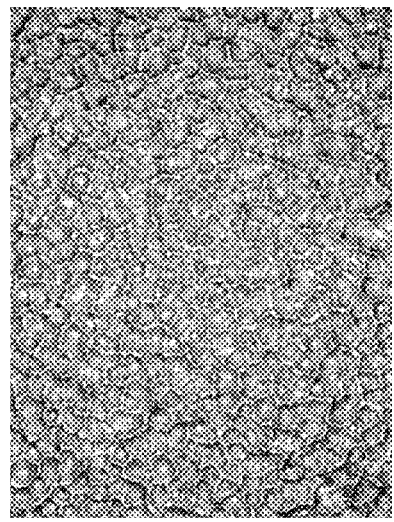
Figure 8:
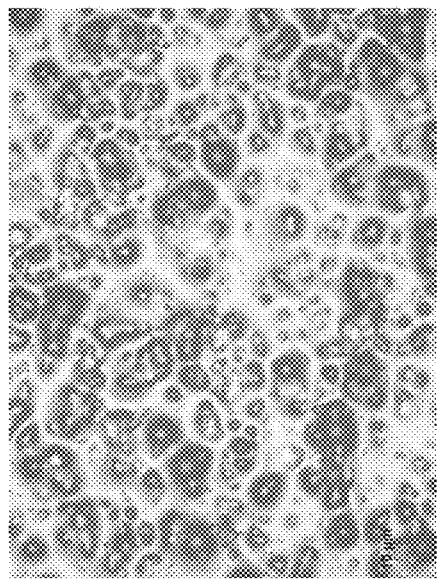

Finally, FIGS. 8 and 9 show light micrographs of the samples of substrates coated according to the disclosure. FIG. 8 shows an image of the coated surface of sample 1, and FIG. 9 is an image of the coated surface of sample 2. FIG. 10 shows a micrograph of the etched surface of the etched glass, for purposes of comparison. In the light micrographs, the etched glass sample in FIG. 10 appears to be the roughest.

Surprisingly, however, both samples according to the disclosure exhibit a higher static friction, as is apparent from the table above. According to yet another embodiment, without limitation to the exemplary embodiments shown in the figures, substrates coated according to the disclosure may further be characterized by their coefficient of static friction, which is at least 0.8. The RMS and Ra values of the layers are substantially smaller than those of an etched glass. For both samples, these values amount to not more than a quarter of the corresponding values of an etched glass. According to yet another modification of the disclosure, without limitation to the exemplary embodiments, the layers according to the disclosure may be characterized by an RMS value and/or an Ra value of not more than 2 µm.

Further advantageous embodiments include multiple printing, wherein two or more layers are printed over one another.

By multiple printing, partial modifications of the topography can be carried out within the haptic surface in order to induce additional optical and haptic variations and/or other functionalizations.

For example, one or more layers W can be introduced onto the applied haptic layer.

These layers (haptic layer and additional layer W) can be applied onto the entire surface or as stoichiometric and/or astoichiometric grids and patterns, ornaments, written characters, etc. or combinations thereof.

This additional layer W can be mixed with color pigments, so that optical contrast results. This additional layer W can be applied with a very small layer thickness (preferably <5 µm, more preferably <2 µm, still more preferably <1 µm), so that it assumes the basic structure of the haptic layer. In this case, an optical contrast, a color contrast results, but the haptic impression is maintained.

In addition, the layer W mixed with color pigments and having a greater layer thickness can be applied over the haptic base layer, so that, for example, a haptic contrast is also additionally produced along with the intense optical contrast. This optical contrast can be adjusted by the use of different color pigments or pigment mixtures.

In order to combine a lower optical contrast with a haptic contrast, a transparent layer W without color pigments can be applied in a greater layer thickness onto the haptic base layer, so that the scattering effect of the base layer is minimized, but the haptic contrast between base layer and the additional layer W is intensified.

Therefore, the transparency, specifically the semi-transparency, and opacity of the layers can be varied over the different layer thicknesses and the pigmentation.

Also, a functionalization of the haptic base layer or of the additional layer(s) W would be possible, such as, for example, with an additional easy-to-clean layer, hydrophobic, anti-fingerprint, and/or antibacterial layer, etc., as a flat-surface or ornamental layer.

Another special embodiment would be the maintaining of the haptic impression and an increase in the optical contrast, by printing a contrast-rich color layer W first and then printing the haptic layer thereover. The contrast-rich color layer is preferably applied hereto as a grid/pattern or written character/symbol.

Embodiment Example:

Production of a layer with velvety appearance and contrast-rich symbols.

17 g of glass flow-forming particles of a ground glass A and 2 g of particles of a spinel-black pigment (particle size <2 µm) are mixed with 61.5 g of screen printing pasting medium and 19 g of texturing, homogeneous spherical methylpolysiloxane particles with a mean particle size of 4.5 µm. The paste produced in this way is homogenized for 10 min by means of a Dispermat®.

Subsequently, this paste is applied by screen printing using a 140 mesh screen onto green glass as localized circles with a diameter of 4 cm and dried at a temperature of 180° C. for 30 min. Then patterns of ceramic paste (layer W) are printed on these circles using the 140 mesh screen and dried again at 180° C. for 30 min. For the ceramic paste, 15 g of glass flow-forming particles of a ground glass A and 3 g of $TiO_2$ pigment (particle size of <1 µm) are homogenized with 65 g of screen printing pasting medium using a three-roll mill.

Burning-in is accomplished at about 900° C. during the ceramization of a bulk-colored substrate made of glass ceramics.

Haptic layers according to the invention with a velvety feel and optical contrast as well as good use properties are obtained.

What is claimed is:

1. A coated glass or glass ceramic substrate, comprising:
a layer having a haptically perceptible texture formed by particles selected from the group consisting of texturing inorganic particles, polysiloxane-based particles, and combinations thereof, the particles being fixed on the substrate by a layer-forming material so that the particles cause protrusions on the layer to produce the haptically perceptible texture, wherein the layer has a volume ratio of the layer-forming material to the particles of greater than 0.1 and a mass ratio of the layer-forming material to the particles that ranges from 20 to 0.1;
at least one, at least partial, additional layer, wherein the additional layer has a thickness of five micrometers or less;
a ratio of intensity of light that is transmitted through the substrate and the layer and passing at an angle of 0° to an intensity of light that is transmitted through the substrate and the layer and scattered at an angle of 10° is at least 2, and
wherein the layer-forming material comprises a glass having a composition (in wt. %) consisting of:

| | |
|---|---|
| $Li_2O$ | 0-10 |
| $Na_2O$ | 0-10 |
| $K_2O$ | 0-10 |
| MgO | 0-5 |
| CaO | 0-5 |
| SrO | 0-4 |
| BaO | 0-24 |
| ZnO | 0-15 |
| $B_2O_3$ | 0-29 |
| $Al_2O_3$ | 0-25 |
| $SiO_2$ | 44-73 |

-continued

| | |
|---|---|
| TiO$_2$ | 0-5 |
| ZrO$_2$ | 0-7 |
| As$_2$O$_3$ | 0-1 |
| Sb$_2$O$_3$ | 0-15 |
| F | 0-3. |

2. The coated substrate according to claim 1, wherein the layer is a local-area layer on only a portion of a surface of the substrate or a full-area layer on all of the surface of the substrate.

3. A coated glass or glass ceramic substrate, comprising:
a layer having a haptically perceptible texture formed by particles selected from the group consisting of texturing inorganic particles, polysiloxane-based particles, and combinations thereof, the particles being fixed on the substrate by a layer-forming material so that the particles cause protrusions on the layer to produce the haptically perceptible texture, wherein the layer has a volume ratio of the layer-forming material to the particles of greater than 0.1 and a mass ratio of the layer-forming material to the particles that ranges from 20 to 0.1;
at least one, at least partial, additional layer, wherein the additional layer is disposed on or under the layer, and wherein the additional layer is transparent; and
a ratio of intensity of light that is transmitted through the substrate and the layer and passing at an angle of 0° to an intensity of light that is transmitted through the substrate and the layer and scattered at an angle of 10° is at least 2.

4. The coated substrate according to claim 1, wherein at least one of the layer and the additional layer is a screen printed layer.

5. The coated substrate according to claim 1, wherein the layer-forming material is selected from the group consisting of an organic matrix, an inorganic matrix, a polysiloxane-based matrix, a silazane-based matrix, a glass-based layer-forming matrix, and any combination thereof.

6. The coated substrate according to claim 1, wherein the layer-forming material exhibits a temperature resistance of more than 500° C.

7. The coated substrate according to claim 1, wherein the layer has a visible degree of surface occupancy of the particles protruding from the layer-forming material of greater than 5%.

8. The coated substrate according to claim 7, wherein the surface occupancy of the particles protruding from the layer-forming material is greater than 30%.

9. The coated substrate according to claim 1, wherein the layer has a volume ratio of the layer-forming material to the particles of greater than 0.4.

10. The coated substrate according to claim 1, wherein the layer has a mass ratio of the layer-forming material to the particles that ranges from 1.8 to 0.4.

11. The coated substrate according to claim 1, wherein the layer has an average spacing of the particles, based on a spacing from a particle center to a particle center, of less than 4 times an average particle diameter of the particles.

12. The coated substrate according to claim 1, wherein the layer has an average layer thickness that ranges between 0.5 μm and 50 μm.

13. The coated substrate according to claim 1, wherein the layer has an average layer thickness at locations without the particles that ranges between 0.1 μm and 20 μm.

14. The coated substrate according to claim 1, wherein the layer has an average layer thickness of the layer-forming material that is always less than an average particle diameter of the particles.

15. The coated substrate according to claim 1, wherein the particles protrude partially from the layer-forming material, the particles having an outer contour selected from the group consisting of edgeless, spherical, polygonal, and combinations thereof.

16. The coated substrate according to claim 1, wherein the particles are edgeless spherical particles and the layer comprises an average level difference between a lowest point on two particles and a highest point on one of these particles that ranges between 4 and 10 μm.

17. The coated substrate according to claim 1, wherein the particles comprise materials selected from the group consisting of glasses, polysiloxanes, SiO$_2$, phenyl polysiloxane, methyl polysiloxane, methylphenyl polysiloxane, organically functionalized polysiloxanes, alkali-poor borosilicate glasses, alkali alumosilicate glasses, oxidic materials, Al$_2$O$_3$, crystalline SiO$_2$, ZrO$_2$, ZrSiO$_4$ ZnAl$_2$O$_4$, MgAl$_2$O$_4$, Y$_2$O$_3$, yttrium-doped ZrO$_2$, calcium-doped ZrO$_2$, magnesium-doped ZrO$_2$, TiO$_2$, and ZnO.

18. The coated substrate according to claim 1, wherein the particles have a softening range from below to about a burning-in temperature of the layer-forming material.

19. The coated substrate according to claim 1, wherein the coated substrate has a reflectance at 550 nm from 6 to 9%.

20. The coated substrate according to claim 1, wherein the coated substrate has a transmittance at 550 nm from 75 to 85%.

21. The coated substrate according to claim 3, wherein the layer-forming material comprises a glass having a composition (in wt. %) of:

| | |
|---|---|
| Li$_2$O | 0-10 |
| Na$_2$O | 0-10 |
| K$_2$O | 0-10 |
| MgO | 0-5 |
| CaO | 0-5 |
| SrO | 0-4 |
| BaO | 0-24 |
| ZnO | 0-15 |
| B$_2$O$_3$ | 0-29 |
| Al$_2$O$_3$ | 0-25 |
| SiO$_2$ | 44-73 |
| TiO$_2$ | 0-5 |
| ZrO$_2$ | 0-7 |
| As$_2$O$_3$ | 0-1 |
| Sb$_2$O$_3$ | 0-15 |
| F | 0-3. |

22. The coated substrate according to claim 3, wherein the layer-forming material comprises a glass having a composition (in wt. %) of:

| | |
|---|---|
| SiO$_2$ | 35-65 |
| Al$_2$O$_3$ | 3-18 |
| B$_2$O$_3$ | 5-25 |
| Li$_2$O | 0-12 |
| Na$_2$O | 0-18 |
| K$_2$O | 0-18 |
| CaO | 0-17 |
| MgO | 0-12 |
| BaO | 0-38 |
| SrO | 0-16 |
| ZnO | 0-38 |
| TiO$_2$ | 0-5 |
| ZrO$_2$ | 0-3 |

-continued

|  |  |
|---|---|
| $Bi_2O_3$ | 0 |
| CoO | 0 |
| $Fe_2O_3$ | 0 |
| MnO | 0 |
| $CeO_2$ | 0 |
| F | 0. |

23. The coated substrate according to claim 3, wherein the layer-forming material comprises a glass having a composition (in wt. %) of:

|  |  |
|---|---|
| $SiO_2$ | 6-20 |
| $Al_2O_3$ | 0-5 |
| $B_2O_3$ | 20-38 |
| $Li_2O$ | 0-2 |
| $Na_2O$ | 0-2 |
| $K_2O$ | 0-2 |
| CaO | 0-2 |
| MgO | 0-2 |
| BaO | 0-2 |
| SrO | 0-2 |
| ZnO | 35-70 |
| $TiO_2$ | 0-5 |
| $ZrO_2$ | 0-5 |
| $Bi_2O_3$ | 0-20 |
| CoO | 0-5 |
| $Fe_2O_3$ | 0-5 |
| MnO | 0-10 |
| $CeO_2$ | 0-2 |
| F | 0-6. |

24. The coated substrate according to claim 1, comprising a haze value of light reflected at the layer that ranges from between 65% and 90%.

25. The coated substrate according to claim 1, comprising a gloss value of light reflected at the layer that ranges between 15% and 35%.

26. The coated substrate according to claim 1, wherein the substrate is a transparent glass ceramic panel having an upper surface coated with the layer, and further comprising a display element arranged under or at a lower surface of the glass ceramic panel so that in operation the display element shines through the layer on the upper surface.

27. A coated glass or glass ceramic substrate, comprising:
a layer having a haptically perceptible texture, the layer being formed by texturing inorganic particles and polysiloxane-based particles fixed on the substrate by a layer-forming material so that the texturing inorganic particles and polysiloxane-based particles cause protrusions on the layer to produce the haptically perceptible texture, wherein the layer has a volume ratio of the layer-forming material to the texturing inorganic particles and polysiloxane-based particles of greater than 0.1 and a mass ratio of the layer-forming material to the texturing inorganic particles and polysiloxane-based particles that ranges from 20 to 0.1; and at least one, at least partial, additional layer, wherein the additional layer comprises color pigments, and is disposed on or under the layer, wherein the layer-forming material comprises a glass having a composition (in wt. %) consisting of:

|  |  |
|---|---|
| $Li_2O$ | 0-10 |
| $Na_2O$ | 0-10 |
| $K_2O$ | 0-10 |
| MgO | 0-5 |
| CaO | 0-5 |
| SrO | 0-4 |
| BaO | 0-24 |
| ZnO | 0-15 |
| $B_2O_3$ | 0-29 |
| $Al_2O_3$ | 0-25 |
| $SiO_2$ | 44-73 |
| $TiO_2$ | 0-5 |
| $ZrO_2$ | 0-7 |
| $As_2O_3$ | 0-1 |
| $Sb_2O_3$ | 0-15 |
| F | 0-3. |

28. The coated glass of claim 1, wherein the additional layer provides to the coated glass or glass ceramic substrate at least one property selected from the group consisting of visible to the human eye, hydrophobic, and anti-bacterial.

29. The coated glass of claim 3, wherein the additional layer provides to the coated glass or glass ceramic substrate at least one property selected from the group consisting of visible to the human eye, hydrophobic, and anti-bacterial.

30. The coated glass of claim 27, wherein the additional layer provides to the coated glass or glass ceramic substrate at least one property selected from the group consisting of visible to the human eye, hydrophobic, and anti-bacterial.

* * * * *